(12) United States Patent
Steffens

(10) Patent No.: US 8,806,801 B2
(45) Date of Patent: Aug. 19, 2014

(54) FISH LANDING NET

(76) Inventor: David A. Steffens, Lake Mills, IA (US)

( * ) Notice: Subject to any disclaimer, the term of this patent is extended or adjusted under 35 U.S.C. 154(b) by 387 days.

(21) Appl. No.: 12/857,301

(22) Filed: Aug. 16, 2010

(65) Prior Publication Data

US 2012/0036758 A1 Feb. 16, 2012

(51) Int. Cl.
*A01K 77/00* (2006.01)
(52) U.S. Cl.
CPC .................................. *A01K 77/00* (2013.01)
USPC ................................................. 43/12; 43/11
(58) Field of Classification Search
USPC ................................................. 43/12, 11, 7
See application file for complete search history.

(56) References Cited

U.S. PATENT DOCUMENTS

| | | | | | |
|---|---|---|---|---|---|
| 273,279 | A | * | 3/1883 | Hosea | 43/11 |
| 412,773 | A | * | 10/1889 | Meisselbach | 43/12 |
| 1,416,543 | A | * | 5/1922 | Bartos | 43/12 |
| 1,450,322 | A | * | 4/1923 | McElhany | 43/12 |
| 1,490,048 | A | * | 4/1924 | Voelker | 43/12 |
| 2,197,921 | A | * | 4/1940 | Brown | 43/12 |
| 2,202,789 | A | * | 5/1940 | Benson | 43/12 |
| 2,205,229 | A | * | 6/1940 | Spriggs et al. | 43/12 |
| 2,420,087 | A | * | 5/1947 | Meek | 43/12 |
| 2,491,703 | A | * | 12/1949 | Bell | 43/12 |
| 2,515,685 | A | * | 7/1950 | Ash | 43/12 |
| 2,637,133 | A | * | 5/1953 | Ross | 43/12 |
| 2,683,321 | A | * | 7/1954 | Faber | 43/12 |
| 2,688,815 | A | * | 9/1954 | Phillips | 43/12 |
| 2,725,658 | A | * | 12/1955 | Wiederhold et al. | 43/12 |
| 2,739,403 | A | * | 3/1956 | Kalmus | 43/12 |
| 2,800,737 | A | * | 7/1957 | Crossan | 43/12 |
| 3,077,693 | A | * | 2/1963 | Wallin | 43/11 |
| 3,548,531 | A | * | 12/1970 | Holden | 43/11 |
| 4,138,790 | A | * | 2/1979 | Schmucker | 43/12 |
| 4,446,646 | A | * | 5/1984 | van't Veld | 43/12 |
| 4,619,065 | A | * | 10/1986 | Jones | 43/11 |
| 4,800,667 | A | * | 1/1989 | Johnson | 43/11 |
| 4,870,773 | A | * | 10/1989 | Schmucker et al. | 43/12 |
| D319,681 | S | * | 9/1991 | Mengo | D22/135 |
| 5,217,315 | A | * | 6/1993 | Rosane | 403/102 |
| 5,339,556 | A | * | 8/1994 | Boehm | 43/12 |
| 5,380,113 | A | * | 1/1995 | Boehm | 43/12 |
| 5,497,580 | A | * | 3/1996 | Vanderplaats | 43/12 |
| 5,533,293 | A | * | 7/1996 | Boehm | 43/12 |
| 6,178,684 | B1 | * | 1/2001 | Nyakas et al. | 43/12 |
| 6,408,560 | B1 | * | 6/2002 | Bloom | 43/12 |
| 6,454,233 | B1 | * | 9/2002 | Adams | 43/12 |
| 6,684,554 | B2 | * | 2/2004 | Yu | 43/7 |
| 6,908,216 | B2 | * | 6/2005 | Love | 43/17.5 |
| 7,124,533 | B2 | * | 10/2006 | Kleckner | 43/12 |
| 7,624,530 | B2 | * | 12/2009 | Resch et al. | 43/12 |
| 7,891,132 | B2 | * | 2/2011 | Hetzner | 43/12 |

(Continued)

FOREIGN PATENT DOCUMENTS

| | | | | | |
|---|---|---|---|---|---|
| EP | 105035 | A1 * | 4/1984 | | A01K 77/00 |
| GB | 2098441 | A * | 11/1982 | | A01K 77/00 |
| GB | 2156192 | A * | 10/1985 | | A01K 77/00 |
| GB | 2290013 | A * | 12/1995 | | A01K 77/00 |
| GB | 2329566 | A * | 3/1999 | | A01K 77/00 |
| GB | 2405777 | A * | 3/2005 | | A01K 77/00 |

(Continued)

*Primary Examiner* — Darren W Ark
(74) *Attorney, Agent, or Firm* — Zarley Law Firm, P.L.C.

(57) ABSTRACT

A landing net having a net member attached to a connecting member that is attached to a handle. The connecting member has at least two locking rings and a receiver attached to each locking ring. Each locking ring has a bushing attached to an inner surface of the ring. The receivers have a non-circular shape and extend parallel to a central axis of the rings.

18 Claims, 4 Drawing Sheets

(56) References Cited

U.S. PATENT DOCUMENTS

| | | |
|---|---|---|
| 8,261,482 B1 * | 9/2012 | Buchanan .......................... 43/12 |
| 8,490,318 B2 * | 7/2013 | Smith et al. ...................... 43/12 |
| 2004/0217246 A1 * | 11/2004 | Adams .............................. 43/12 |
| 2005/0005497 A1 * | 1/2005 | Boltan et al. ....................... 43/7 |
| 2006/0059763 A1 * | 3/2006 | Passint et al. .................... 43/11 |
| 2012/0186133 A1 * | 7/2012 | Smith et al. ...................... 43/12 |
| 2013/0091755 A1 * | 4/2013 | Marks .............................. 43/11 |

FOREIGN PATENT DOCUMENTS

| | | | | |
|---|---|---|---|---|
| JP | 08116827 A | * | 5/1996 | ............ A01K 77/00 |
| JP | 2001161215 A | * | 6/2001 | ............ A01K 77/00 |
| JP | 2003092957 A | * | 4/2003 | ............ A01K 77/00 |
| JP | 2005323507 A | * | 11/2005 | ............ A01K 77/00 |
| JP | 2007028952 A | * | 2/2007 | ............ A01K 77/00 |
| JP | 2010148361 A | * | 7/2010 | ............ A01K 77/00 |
| JP | 2011205928 A | * | 10/2011 | ............ A01K 77/00 |
| WO | WO 9500013 A1 | * | 1/1995 | ............ A01K 77/00 |

* cited by examiner

FISH LANDING NET

BACKGROUND OF THE INVENTION

This invention is directed toward fishing, and more particularly to an improved fishing net.

Fishing nets are well known in the art. As an example, U.S. Pat. No. 5,533,293 by Boehm, incorporated by reference herein in its entirety, discloses a foldable landing net with a telescoping handle that used fewer parts that were all connected together for both transport and use. While Boehm '293 represented an improvement in the art, deficiencies remained. As an example, as a result of using an aluminum handle and an aluminum connecting member, the handle would sometimes bind or at least would not slide easily. Also, the manner of joining the net frame to the connecting member required many parts, was costly, and limited the load that could be received in the net. Therefore, a need exists in the art for a fish landing net that addresses these deficiencies.

An objective of the present invention is to provide a fishing net where the handle slides easily within a connecting member.

Another objective of the present invention is to provide a stronger connection between the net and the connecting member.

A still further objective of the present invention is to provide a fishing net having fewer parts that is more economical to manufacture.

These and other objectives will be apparent to one skilled in the art based upon the following disclosure.

SUMMARY OF THE INVENTION

A fish landing net having a net member with two frame members threaded through a mesh net that are foldably connected. A connecting member having at least two locking rings has a pair of receivers that are attached to each locking ring and receive ends of the frame members to connect the net member to the connecting member. The receivers preferably are non-circular in shape and extend parallel to a central axis of the locking rings. The connecting member slidably receives a handle.

DETAILED DESCRIPTION OF THE PREFERRED EMBODIMENT

Figure 1:
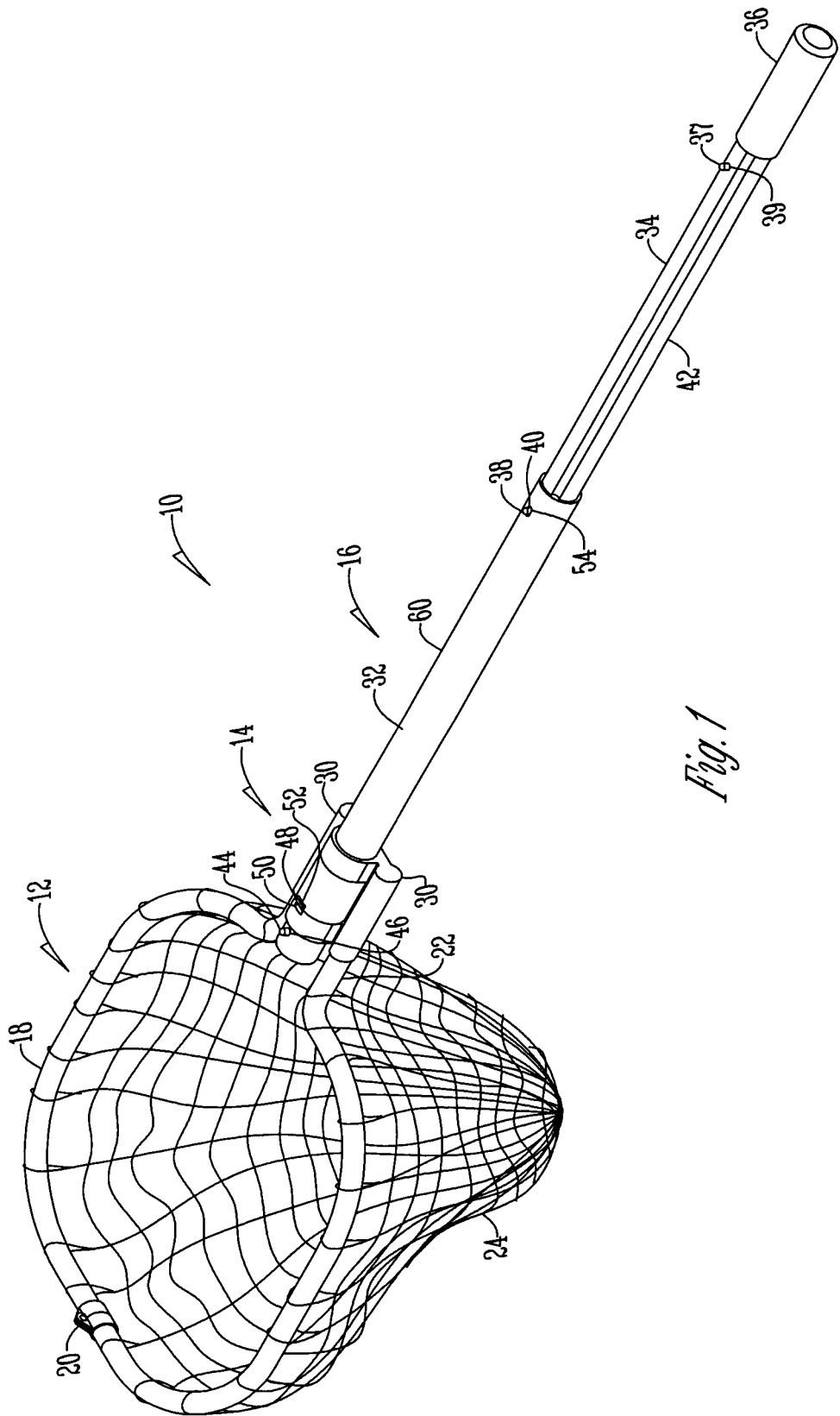
FIG. 1 is a perspective view of a net in an extended position.
Figure 2:
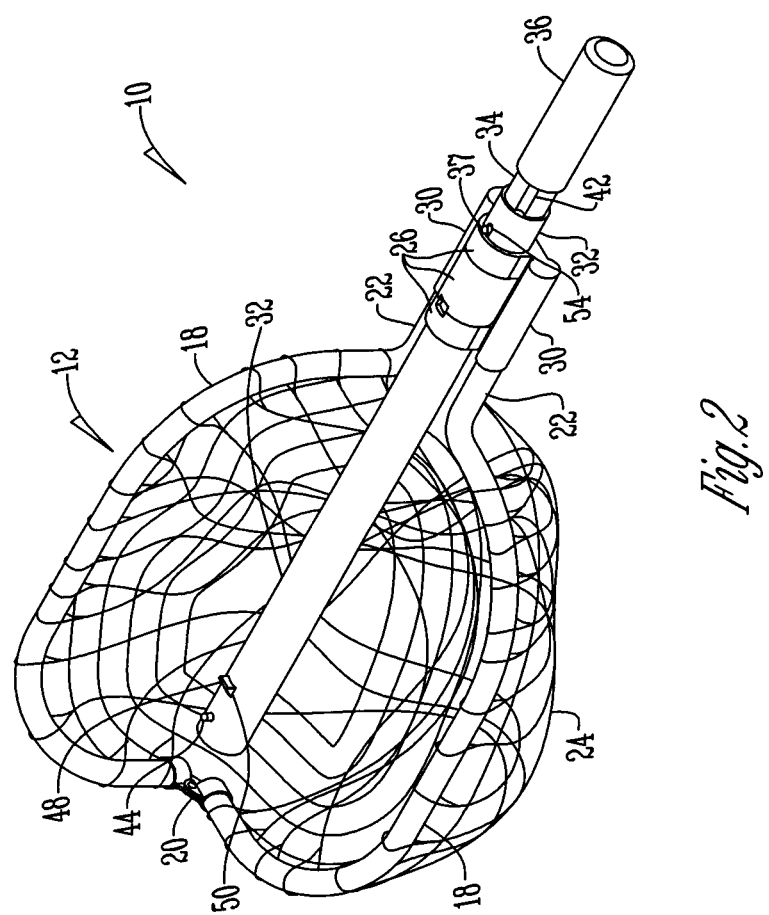
FIG. 2 is a perspective view of a net in a partially closed position.

Referring to the Figures, the landing net 10 has a net member 12, a connecting member 14, and a handle 16. The net member 12 has a pair of frame members 18 that are foldably or pivotally connected at a first end 20 and are attached at a second end 22 to the connecting member 14. The frame members 18 are threaded through mesh netting 24.

The connecting member 14 has at least two and preferably three locking rings 26 that are in alignment with one another. Each ring 26 has a groove 28 formed on the inner surface of the ring 26 with the grooves 28 of each ring 26 also being in alignment. Attached to the inner surface of each ring is a plastic bushing 29. The bushing provides a barrier between the handle 16 and the connecting member 14 to allow the two pieces to slide more easily. Attached to the rings 26 are a pair of hollow receivers 30 that are formed to receive the second end 22 of the frame members. The receivers 30 are generally parallel to the longitudinal axis of the handle 16 and rings 26 and are of a non-circular shape such as an oval, triangle, square or the like. By extending parallel to the longitudinal axis of the rings, the strength of the connection of the net member 12 is increased allowing for heavier loads. In addition, the non-circular shape of the receiver 30 prevents the rotation of the frame member 18 within the receiver which eliminates the need for a connecting rivet which would weaken the structural integrity of the receiver 30. The receivers are attached to separate rings 26 to permit rotation about the handle 16 which will be explained in greater detail below.

Figure 3:
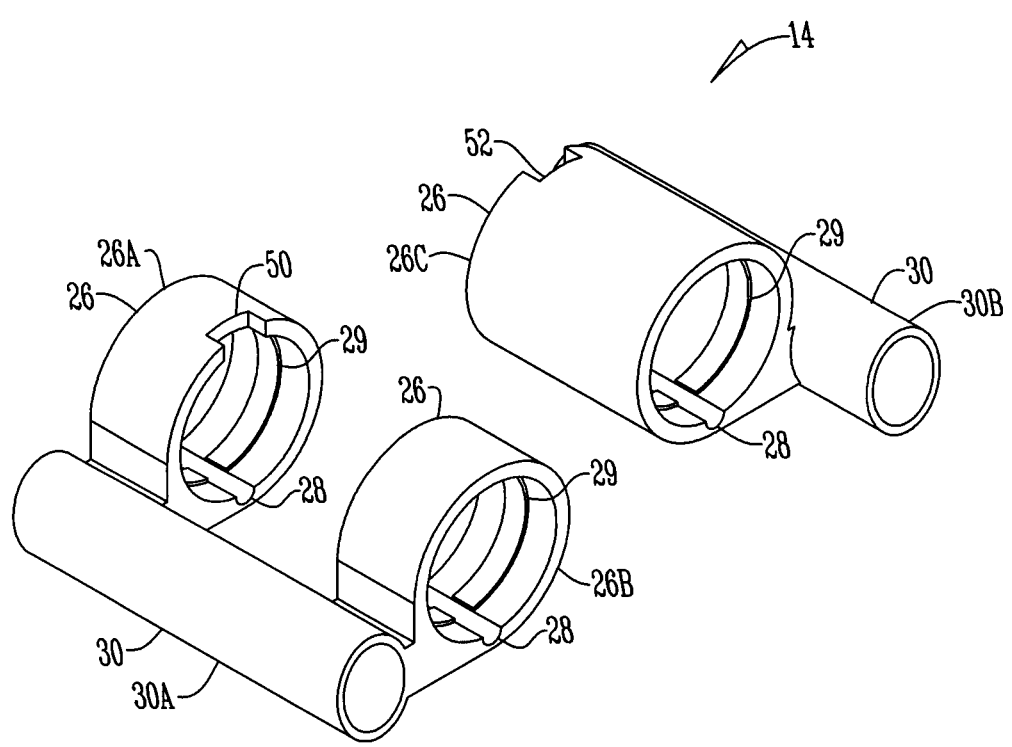
FIG. 3 is an exploded view of a connecting member.
Figure 4:
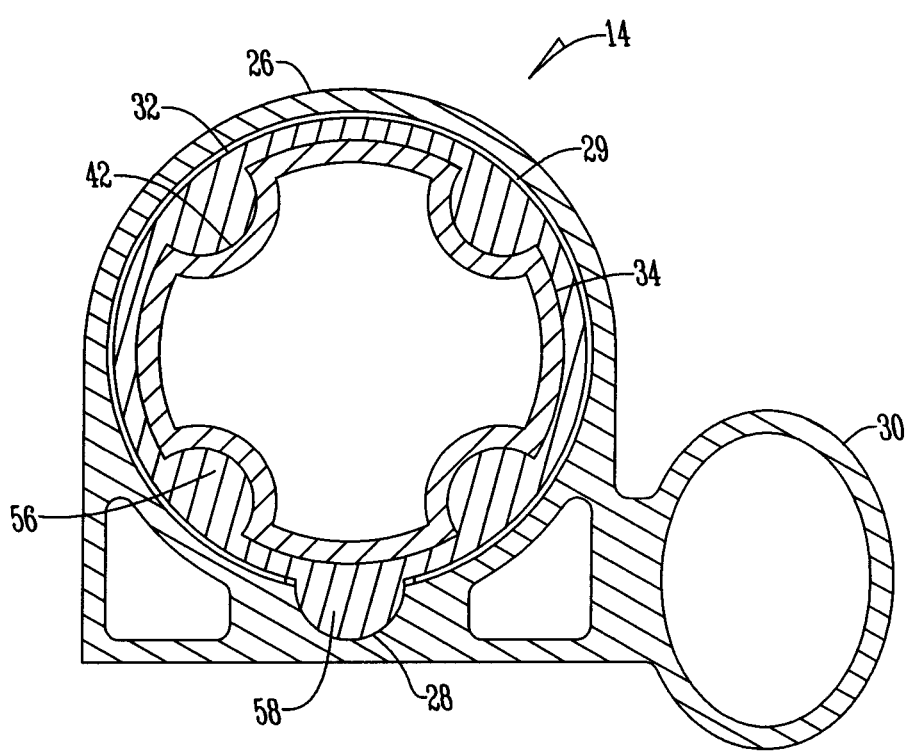
FIG. 4 is an end view of a locking ring and receiver.

In one arrangement, as is pictured in FIG. 3, connecting member 14 has three locking rings, 26A, 26B and 26C, wherein first locking ring 26A and second locking ring 26B are connected to a first hollow receiver 30A and third locking ring 26C is connected to a second hollow receiver 30B. In this arrangement, first locking ring 26A, second locking ring 26B third locking ring 26C are positioned in parallel alignment along the longitudinal axis of handle 16 with third locking ring 26C being positioned between first locking ring 26A and second locking ring 26B.

The handle 16 has a first shaft 32 and a second shaft 34 telescopically received within the first shaft 32. The second shaft 34 has a grip 36 attached to one end, a spring loaded pin 37 adjacent the grip that extends through opening 39, and a spring loaded pin 38 that extends through a second opening 40 at the opposite end. Extending along the length of the second shaft 34 is at least one, and preferably four, grooves 42. The first shaft 32 has a spring loaded pin 44 that extends through an opening 46 at one end. The pin 44 is operatively connected to a latch 48 that extends through a second opening 50 in the first shaft 32 such that the latch is selectably received in a catch 52 or notch formed in one or more locking rings 26. At the opposite end of the first shaft 32 is a third opening 54 that receives pin 37 when the second shaft 34 is in a retracted position and pin 38 when the second shaft 34 is in an extended position. Extending along the inner surface of the first shaft 32 is at least one protrusion 56 which is positioned to be slidably received within grooves 42 of the second shaft 34. The slidable engagement of the protrusions 56 within the grooves 42 maintains alignment of pins 37 and 39 of the second shaft with opening 54 of the first shaft 32. While shown as a double handle, the handle 16 could be a triple handle and still fall in the scope of this disclosure.

Extending along a portion of the outer surface of the first shaft 32 is a protrusion 58 that is positioned to be received within groove 28 of rings 26. When the protrusion 58 is received within grooves 28 the rings 26 are prevented from rotating which prevents the net member 12 from collapsing or folding. The protrusion 58 extends only along a portion of the outer surface such that a release area 60 is created on the outer surface of the first shaft 32.

In operation, when in an extended position, the net member 12 is locked in an open position by the connecting member 14. More specifically, protrusion 58 is received within grooves 28 which prevents rotation of the rings 26 in relation to one another. In addition, latch 48 extends through opening 50 and is received within catch 52 which prevents longitudinal movement of the first shaft 32 within rings 26. Also, pin 38 of the second shaft 34 is received within opening 54 of the first shaft 32 to lock the second shaft 34 in an extended position.

To convert to a storage or transport position the pin 38 is manually depressed to allow the second shaft 34 to slide within first shaft 32 until pin 37 of the second shaft 34 is received within opening 54 of the first shaft 32 to lock the second shaft 34 in a retracted position. Pin 44 is also manually depressed which in turn depresses latch 48 to allow the first shaft 32 to slide through rings 26 toward net member 12 until the rings 26 reach the release area 60. Once rings 26 reach the release area 60 at least one ring 26 is rotated toward another causing the net member 12 to fold together.

Accordingly, a landing net has been disclosed that, at the very least, meets all of the stated objectives.

What is claimed is:

1. A net, comprising:
    a net member having a pair of frame members threaded through a mesh net;
    each of the frame members having a first end and a second end;
    a connecting member having at least two locking rings and a receiver attached to each of the at least two locking rings that receive the second ends of the frame members;
    a handle attached to the connecting member;
    wherein the connecting member slides along a longitudinal axis of the handle between an extended position and a storage position;
    wherein the connecting member rotates on the handle between an open position and a collapsed position; and
    wherein the receivers are generally parallel to the longitudinal axis of the handle.

2. The net of claim 1 wherein the receivers have a non-circular shape.

3. The net of claim 1 wherein the at least two locking rings have a plastic
    bushing attached to an inner surface of each of the at least two locking rings.

4. The net of claim 1 wherein the frame members are foldably or pivotally connected at their first ends to one another.

5. The net of claim 1 wherein when the connecting member is in the open position, the frame members are positioned approximately opposite one another.

6. The net of claim 1 wherein when the connecting member is in the collapsed position, the frame members are positioned approximately adjacent one another.

7. The net of claim 1 wherein when the connecting member is in the open position, the net member is in an open condition and ready for use.

8. The net of claim 1 wherein when the connecting member is in the collapsed position, the net member is in a collapsed condition and ready for storage.

9. The net of claim 1 wherein the handle has a first shaft and a second shaft that telescopically extend and retract.

10. The net of claim 1 wherein the connecting member is adjacent a first end of the handle when in the extended position, and the connecting member is adjacent a second end of the handle when in the storage position.

11. A net, comprising:
    a net member having a pair of frame members threaded through a mesh net;
    a connecting member having at least two locking rings and a receiver attached to each of the at least two locking rings that receives an end of each frame member;
    a handle attached to the connecting member;
    wherein the connecting member slides along the handle between an extended position and a storage position;
    the connecting member rotates on the handle between an open position and a collapsed position; and
    a plastic bushing is attached to an inner surface of each of the at least two locking rings.

12. A net, comprising:
    a net member having a first frame member and a second frame member threaded through a mesh net;
    a connecting member having a first locking ring, a second locking ring and a third locking ring and a first receiver attached to the first locking ring that receives an end of the first frame member and a second receiver attached to the third locking ring that receives an end of the second frame member;
    the first receiver and second receiver having non-circular shapes;
    a handle attached to the connecting member;
    wherein the connecting member slides along the handle between an extended position and a storage position; the connecting member rotates on the handle between an open position and a collapsed position; and
    wherein the third locking ring is positioned between the first locking ring and the second locking ring.

13. The net of claim 12 wherein the first and second receivers extend in parallel spaced alignment to a central axis of the locking rings.

14. The net of claim 12 wherein at least one of the first, second, and third locking rings has a plastic bushing attached to an inner surface of the at least one of the first, second, and third locking rings.

15. The net of claim 12 wherein each locking ring has a plastic bushing attached to an inner surface of the locking ring.

16. The net of claim 12 wherein the net member is foldable.

17. The net of claim 12 wherein the handle is telescopic.

18. The net of claim 12 wherein the first locking ring rotates in relation to the third locking ring between the open position and the collapsed position.

\* \* \* \* \*